Patented Dec. 29, 1953

2,664,414

UNITED STATES PATENT OFFICE 2,664,414

MONOMERS AND POLYMERS OF UNSATURATED THIOETHERS

Rupert C. Morris, Berkeley, and George W. Conklin, Oakland, Calif., assignors to Shell Development Company, Emeryville, Calif., a corporation of Delaware No Drawing. Application March 8, 1952, Serial No. 275,674

12 Claims. (Cl. 260—78.5)

This invention relates to the provision of novel vinyl sulfide compounds and to the polymers which can be formed therewith.

The monomers of the present invention are exemplified by 3,6-dithia-1,7-octadiene, and 3-oxa-6-thia-1,7-octadiene and can be represented by the general formula $$CH_2=CH-S-R-X-CH=CH_2$$

In this formula X represents —S—, and —O—, while R represents any divalent organic radical as, for example, a methylene, ethylene, trimethylene, phenylene, biphenylene, naphthalene, 3-thiapentanene, xylylene, 3-oxabutanene, allylene, isopropenylene or tolylene radical, or the like. A preferred group of monomers is that wherein R is an alkylene or a thia- or oxa-alkylene radical (e. g., —$CH_2$—, —$CH_2CH_2$—, —$CH_2$—S—$CH_2$—,

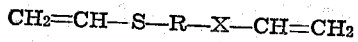

or —$CH_2CH_2$—O—$CH_2CH_2$—), and X is a thia or an oxa atom.

Compounds which are representative of the above compositions of the present invention are monomeric and polymeric 3,6-dithia-1,7-octadiene
3-oxa-6-thia-1,7-octadiene
3,6,9-trithia-1,10-undecadiene
3,5-dithia-1,6-heptadiene
3-oxa-6,9-dithia-1,10-undecadiene
3,5-dioxa-7-thia-1,8-nonadiene
3-oxa-5,7-dithia-1,8-nonadiene
1,4-bis(vinylmercapto)benzene
3,6,9-trithia-1,10-undecadiene The novel monomers of the present invention can be prepared by any method adapted to the preparation of said compounds generally. For example, 3,5-dithia-1,6-heptadiene can readily be prepared by reacting two moles of beta-chloroethyl mercaptan with one mole of formaldehyde, and then splitting out two moles of HCl from the resulting compound by heating the same with an alcoholic solution of caustic. Those of the compounds which contain at least two carbon atoms in the chain between the sulfur, or oxygen atoms positioned adjacent the terminal vinyl groups can best be prepared by reacting the corresponding dimercaptan, or mercapto-alcohol with acetylene, this reaction going forward at elevated temperatures of between about 100 and 175° C. and preferably at elevated pressures (above 100 p. s. i. g.) in the presence of potassium hydroxide or other alkaline catalyst. Copper in the form of a copper salt (e. g.

$CuCl_2$) can also be employed along with the caustic, the copper acting to further promote the reaction. The following general equation is illustrative of this mode of preparation:

HS—R—XH+$2C_2H_2$→

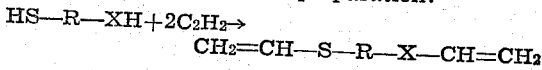

In the foregoing equation R is a divalent organic radical, while X represents —S—, or —O—.

The preferred manner of executing the reaction with acetylene is to place the sulfur-containing reactant in a suitable pressure vessel, optionally along with an inert solvent, as dioxane, for example, and a catalyst, then to pressure the vessel with acetylene and heat the reactants at a temperature of between about 115° C. and 150° C. until there is no further reaction. The end point of the reaction can conveniently be determined by disconnecting the pressurizd reactor unit from the source of acetylene and then observing the point at which no further diminution in the pressure within the vessel occurs.

The pressure to be maintained in the reaction vessel is not critical, though good results have been obtained at from about 100 to 500 p. s. i. g. It is important that all oxygen be excluded from the reactor; accordingly, the preferred method of operation is to first pressurize the reaction vessel with an inert gas, as nitrogen, or the like, and then to add the acetylene to the already pressurized reaction vessel. In the case of dimercaptan reactants, the reaction is normally complete in heating periods of from about 5 to 30 minutes. However, in the case of mercapto-alcohol reactants, it is preferable to employ more extended reaction periods of several hours duration. Again, it is always possible to determine the proper end point of the reaction by observing the point at which no further diminution of acetylene pressure occurs. Care should be observed, however, not to be misled by the fact that in the case of mercapto-alcohol reactants, the pressure drops off at a much slower rate once the hydrogen atom on the sulfur atom of the mercapto group has been replaced by acetylene. While this hydrogen can be replaced in a period of several minutes, that attached to an oxygen atom is replaced at a much slower rate and frequently requires periods of 5 to 15 hours for complete replacement.

When it is desired to prepare monomers by a practice of any of the foregoing methods, it is obvious that precautions should be observed to prevent undue polymer formation since the monomers, once formed, are capable of being readily polymerized. Thus, polymerization is minimized as the reaction is carried out for the shortest possible times and at temperatures which are not appreciably above those required to effect the desired reaction at an efficient rate. In some cases it may be advisable to conduct the reaction in the presence of a polymerization inhibitor such as tannic acid or hydroquinone.

By whatever method produced, the monomer compounds can be separated from the reaction mixture by fractional distillation (preferably under reduced pressures) or by other suitable means.

The monomers of the present invention possess a variety of unusual and unexpected properties which make them of considerable interest from the commercial standpoint. Thus, they have useful insecticidal properties and also impart extreme pressure and anti-wear qualities to lubricating oils. They are also of considerable utility as intermediates. Thus, addition of HCl forms compounds which have vesicant properties. The solid, high molecular weight polymers of the invention are useful components of various resins and coatings. The liquid polymers of relatively low molecular weight are useful as lubricants and as hydraulic fluids.

The polymeric compounds of this invention are prepared from the monomer compounds by any of the methods known in the art. Thus, when homopolymers are prepared no other reactant than the monomer is required, though in forming copolymers an appropriate unsaturated compound of the type discussed in the succeeding paragraphs is employed. In general, the conditions leading to the formation of the homopolymers are the same as those practiced when the monomers are combined with other polymerizable material to form copolymers, polymerization usually being effected in either case by the application of heat and preferably the addition of a catalyst.

The compounds which can be reacted with the monomers of the type described above to form the copolymers of this invention are those having at least one aliphatic group of two carbon atoms connected together by an olefinic linkage capable of undergoing addition polymerization. One important group of such copolymerizable compounds is that containing in the molecule a single polymerizable, olefinic linkage, as represented by styrene, vinyl halides, vinylidene halides, vinyl esters of saturated monocarboxylic acids, methylacrolate, methylmethacrolate, and the allylhalides and esters of saturated monocarboxylic acids. Another important group consists of unconjugated polymerizable compounds having in the molecule two or more non-conjugated polymerizable unsaturated linkages, as represented by the unsaturated aliphatic polyesters of saturated poly-basic acids, the polyesters of saturated polyhydric alcohols with unsaturated organic acids, and the esters of unsaturated alcohols with unsaturated aliphatic acids. Other polymerizable unsaturated compounds are those containing in the molecule one or more polymerizable organic radicals and one or more inorganic radicals or elements, as exemplified by the vinyl, allyl and methallyl esters of phosphoric acid and of the ortho acids of silicon. Another important group of copolymerizable compounds consists of those having in the molecule a plurality of conjugated, unsaturated, polymerizable, carbon-to-carbon linkages (preferably 2) as, for example, conjugated butadiene, conjugated chlorobutadiene, isoprene and the other conjugated pentadienes, and the conjugated hexadienes together with the homologues, analogues and suitable substitution products of these conjugated compounds.

A particularly valuable class of copolymers is that formed between the monomers of the present invention and the allyl esters of aromatic polycarboxylic and ethereal oxygen-containing polycarboxylic acids, e. g., diallyl phthalate and diallyl diglycolate. Copolymers containing from about 5 to 98% of the monomer compounds of the present invention can be prepared, and preferably the copolymer contains from about 25 to 75% by weight of the novel monomer disclosed herein.

As has been noted above, the polymer compounds of the invention are preferably formed in the presence of a polymerization catalyst. For this purpose there can be employed aluminum chloride, iron chloride, boron trifluoride or other Friedel-Crafts catalyst, or there can be employed oxygen, ozone, a peroxide or other free-radical-generating catalyst. Benzoyl peroxide has been found satisfactory for this purpose, as have acetyl peroxide, benzoyl acetyl peroxide, lauryl peroxide, dibutyryl peroxide, succinyl peroxide, sodium peroxide, barium peroxide, tertiary alkyl hydroperoxides such as tertiary butyl hydroperoxide, di(tertiary alkyl) peroxides such as di-(tertiary butyl) peroxide and 2,2-di-tert.-butylperoxy)-butane, peracetic acid, perphthalic acid, perborates and persulfates. Metals and metallic salts can also be used as polymerization catalysts. If desired, mixtures of polymerization catalysts can be used, a particularly suitable mixture being that of benzoyl peroxide and hydrogen peroxide. The amount of peroxide catalyst used will ordinarily be between about 0.01% and about 12%, although it is not necessarily limited to this range.

Polymerization is usually energized by the application of heat, although both heat and light may be used, and in some cases, light alone may be sufficient. Temperatures of between about 60° C. and 250° C. are preferred, although somewhat higher or even lower temperatures can be used on occasion.

The monomeric compounds can be polymerized in the massive state or in the form of dispersions or solutions. Where a dispersion method is employed, it may be desirable to select a dispersing medium insoluble in the catalyst involved. With certain compounds polymerization can be effected in the vapor state. Continuous or discontinuous processes may be used, as may atmospheric, reduced, or superatmospheric pressures. Polymerization may also be carried out under a blanket of an inert gas.

The polymerization reaction can be carried to completion without substantial interruption or it can be stopped at any point short of completion with resultant formation of a partial polymer, i. e., a mixture of both monomer and polymer. This partial polymer mixture may be used as such, or the unreacted monomer may be separated from the mixture by solvent extraction, distillation or other method. The separated polymer may then be worked up in any known or special manner. In the case of many compounds, particularly in the case of the polymerization of compounds having two or more non-conjugated polymerizable unsaturated linkages in the molecule, the separated polymer may be capable of still further polymerization.

The following examples illustrate the invention in various of its embodiments:

Example I

Into a stainless steel autoclave there was introduced 51 grams of ethylene dimercaptan, 10 grams potassium hydroxide and 158 grams dioxane. The vessel was then pressured to 100 p. s. i. g. with nitrogen, following which acetylene was admitted under pressure until a total pressure of about 350 p. s. i. g. was established in the system. The reactor was then heated with stirring to a temperature of between about 120 and 130° C. for about 10 minutes, at the end of which time the pressure had been observed to drop to about 150 p. s. i. g. The vessel was then again pressured with acetylene to about 350 p. s. i. g. and thereafter heated at about 125° C. for an additional period of about 10 minutes, it being observed that there was then no appreciable further reduction in the pressure within the reactor. The product was then removed from the reactor, filtered, and the filtrate distilled under vacuo. There were recovered 40 grams of a fraction boiling between 57 and 60° C. at 1.6 mm. Hg, and melting at −23° C. This fraction had a faint sulfurous odor and was a relatively white, non-viscous liquid. Analysis disclosed it to be 3,6-dithia-1,7-octadiene, the composition being:

|  | Found | Calculated |
| --- | --- | --- |
| Percent C | 49.21 | 49.3 |
| Percent H | 6.94 | 6.85 |
| Percent S | 43.5 | 43.8 |

Four volumes of the 3,6-dithia-1,7-octadiene material prepared as described in the foregoing paragraph were then heated at atmospheric pressure and at a temperature of between 90 and 97° C. in the presence of 0.1 volume of 2,2-di(tert.-butylperoxy)butane catalyst. At the end of two hours the liquid reaction mixture had polymerized to a clear hard solid. A solid polymer having substantially the same physical characteristics was also obtained under these same conditions by employing 2 volumes of 3,6-dithia-1,7-octadiene together with 2 volumes of diallyl phthalate and 0.1 volume of the peroxide catalyst.

Example II

In this example 80 grams of bis(2-mercaptoethyl)sulfide, together with 190 grams dioxane solvent and 10 grams potassium hydroxide catalyst, were reacted with acetylene in a pressure vessel using the same general procedure as described above in Example I, the reaction being complete after a heating period of approximately 10 minutes at reaction temperatures between about 120 and 130° C. On filtering the resulting reaction mixture and distilling the same there was recovered 68 grams of material boiling between 105 and 108° C. at 0.25 mm. Hg., and having a melting point of −12° C. This product, which was established to be 3,6,9-trithia-1,10-undecadiene, had the following composition:

|  | Found | Calculated |
| --- | --- | --- |
| Percent C | 46.5 | 46.6 |
| Percent H | 6.92 | 6.8 |
| Percent S | 46.3 | 46.6 |

Four volumes of the white, relatively non-viscous liquid monomer were then heated at atmospheric pressure at temperatures between about 90 and 97° C. in the presence of 0.1 volume of 2,2-di(tert.-butylperoxy)butane catalyst. The resulting mixture polymerized to a clear solid after being heated for approximately two hours. When this test was repeated, but with a mixture containing 2 volumes of the monomer together with 2 volumes of diallyl phthalate and 0.2 volume of catalyst, the mixture became solid after approximately a three hour heating period.

Example III

In this operation 3-oxa-6-thia-1,7-octadiene was prepared by reacting 172 grams of mercaptoethanol with acetylene in the presence of 10 grams of potassium hydroxide and in the absence of any solvent. The general procedure followed was that described above in Example I. Here, however, while half the total amount of acetylene which eventually entered into the compound was absorbed in a reaction period of about 15 minutes, it was thereafter found necessary to heat the reaction mixture for a further period of about 14 hours at a temperature between 120 and 130° C. before the balance of the acetylene reacted and the pressure within the vessel finally leveled off. On filtering the resulting reaction mixture and distilling the same, there was recovered 107 grams of a fraction boiling between 37.4 and 40° C. at 3 mm. Hg. This material, which was observed to have a melting point below −72° C., was shown to be 3-oxa-6-thia-1,7-octadiene, its analysis being:

|  | Found | Calculated |
| --- | --- | --- |
| Percent C | 54.68 | 55.4 |
| Percent H | 7.84 | 7.69 |
| Percent S | 25.68 | 24.6 |
| Percent O | 12.48 | 12.31 |

Four volumes of the white, relatively non-viscous liquid monomer were then heated at atmospheric pressure at temperatures between about 90 and 97° C. in the presence of 0.2 volume of 2,2-di(tert.-butylperoxy)butane catalyst. The resulting mixture became viscous after 2 hours and polymerized to a clear, tough solid after a heating period of approximately 3 hours. The same results were obtained when this test was repeated, but with a mixture containing 2 volumes of the monomer together with 2 volumes of diallyl phthalate and 0.2 volume of catalyst.

The invention claimed is:
1. 3,6-dithia-1,7-octadiene.
2. 3,6,9-trithia-1,10-undecadiene.
3. 3-oxa-6-thia-1,7-octadiene.
4. A polymer of 3,6-dithia-1,7-octadiene.
5. A polymer of 3,6,9-trithia-1,10-undecadiene.
6. A polymer of 3-oxa-6-thia-1,7-octadiene.
7. A copolymer of 3,6-dithia-1,7-octadiene with another polymerizable organic compound having an aliphatic group of two carbon atoms which are connected together by an olefinic linkage capable of undergoing addition polymerization.
8. A copolymer of 3,6,9-trithia-1,10-undecadiene with another polymerizable organic compound having an aliphatic group of two carbon atoms which are connected together by an olefinic linkage capable of undergoing addition polymerization.
9. A copolymer of 3-oxa-6-thia-1,7-octadiene with another polymerizable organic compound having an aliphatic group of two carbon atoms which are connected together by an olefinic linkage capable of undergoing addition polymerization.

10. A compound having the general formula $$CH_2=CH-S-R-X-CH=CH_2$$

wherein X represents an atom selected from the group consisting of —S— and —O—, and wherein R represents a divalent organic radical selected from the group consisting of lower alkylene hydrocarbon radicals, lower mono-thio-alkylene hydrocarbon radicals and lower mono-oxy-alkylene hydrocarbon radicals.

11. A polymer of a compound of claim 10.

12. A copolymer of a compound of claim 10 with another, dissimilar, polymerizable organic compound having an aliphatic group of two carbon atoms which are connected together by an olefinic linkage capable of undergoing addition polymerization.

RUPERT C. MORRIS.
GEORGE W. CONKLIN.

References Cited in the file of this patent

UNITED STATES PATENTS

| Number | Name | Date |
| --- | --- | --- |
| 2,043,941 | Williams | June 9, 1936 |
| 2,136,178 | Carothers | Nov. 8, 1938 |
| 2,563,383 | Vaughan | Aug. 7, 1951 |